Donald W. Munger,
Gerald de G. Cowan,
INVENTORS.
BY.

ATTORNEY.

Donald W. Munger,
Gerald de G. Cowan,
INVENTORS
BY.

ATTORNEY.

United States Patent Office 3,482,434
Patented Dec. 9, 1969

3,482,434
ULTRASONIC NONDESTRUCTIVE TESTER INCLUDING MEANS FOR SEPARATING ELECTRICAL NOISE FROM THE ELECTRICAL SIGNALS
Gerald de G. Cowan, New Preston, and Donald W. Munger, New Milford, Conn, assignors to Automation Industries, Inc., a corporation of California
Filed Feb. 23, 1966, Ser. No. 529,437
Int. Cl. G01n 9/24
U.S. Cl. 73—67.8                                    7 Claims

ABSTRACT OF THE DISCLOSURE

An ultrasonic nondestructive tester is described, which includes an ultrasonic transducer with an accompanying pulser and receiver. The receiver includes a noise reject circuit and an amplifier. The noise reject circuit includes two cascaded transistors, one arranged in a grounded emitter configuration and the other, coupled thereto, connected as an emitter follower. The base and emitter of the second transistor are connected to the collector and emitter circuits, respectively, of the first transistor so that the quiescent base emitter voltage does not pass low amplitude signal pulses. Varying the potential applied to the base of the second transistor varies the noise reject level, but due to the emitter base connections to the first transistor the output amplitude of signals remains constant.

---

Figure 1:
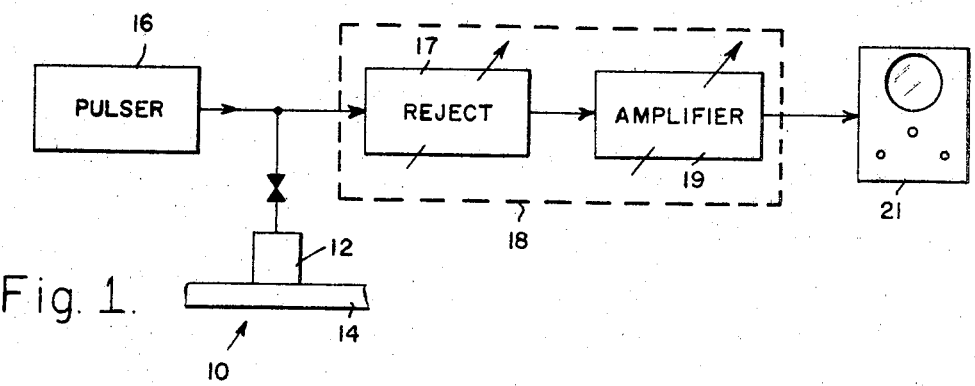

The present invention relates to ultrasonic nondestructive testers and more particularly to means for separating electrical "noise" from the electrical signals in such testers.

In ultrasonic nondestructive testers pulses of ultrasonic energy are coupled into a workpiece. This energy is then received by a suitable transducer which produces corresponding pulse type electrical signals. These signals include a steady state reference level with pulses being spaced therealong to represent the various ultrasonic echoes received by the transducer. The signals, and particularly the pulses therein, are processed to determine the various characteristics of the workpiece. Normally "noise" occurring at various points in the tester becomes mixed with the test signals and particularly those steady state portions between the important pulses.

This "noise" detracts from the test results and may even completely invalidate the test if the "noise" is treated as a pulse. Accordingly, it is very desirable to remove the "noise" from the signal before the pulses are processed. In the normal ultrasonic tester the pulses have amplitudes in excess of the "noise." Accordingly it possible to separate the pulses from the "noise" by rejecting all portions of the signal below some preselected reject level.

Heretofore, this has been accomplished by providing a diode or similar device which is back biased to the reject level. As long as the signal is below this level the diode is blocked and the output signal is maintained at some constant level, such as ground. All the low amplitude "noise" is thereby blocked. Only when the amplitude of the signal is in excess of the reject level will the diode become conductive and pass the portion of the signal above the reject level. Hopefully this provides a "noise" free signal or a signal with an improved signal-to-noise ratio. This result is obtained where there is initially a high signal-to-noise ratio and the reject level is considerably below the range of amplitudes of the pulses that are of interest.

Unfortunately in the prior art reject circuits only that portion of the signal in excess of the reject level is passed. As a consequence in those nondestructive testers wherein the signal-to-noise ratio is initially low and it is necessary to preserve low amplitude pulses which are only slightly in excess of the reject level, only a very small portion of the pulse is passed by the reject circuit. Thus, even though a majority of the "noise" is rejected, the passed portion of the pulse is so small that it still possesses a very small signal-to-noise ratio on the same order as before.

In addition, if the reject level increased, the amplitude of the passed signal is correspondingly decreased. This, in turn, necessitates increasing the overall gain of the tester to restore the amplitude of the passed signal to its prior level. Such an adjustment of the gain effects the reject level whereby it needs to be readjusted. As a consequence, several adjustments of the gain and reject are required. Moreover, when the gain is varied it becomes necessary to recalibrate the tester. It will thus be seen that prior art reject circuits have not been entirely satisfactory for use in all types of ultrasonic nondestructive testers.

The present invention provides means for overcoming the foregoing difficulties. More particularly, a nondestructive tester is provided wherein the signal-to-noise ratio of even low amplitude pulse signals may be improved by rejecting all portions of the signal below a reject level. The tester includes reject means that rejects low amplitude signals and passes the signals above reject level whereby the passed signal has an amplitude that is essentially the same as before the reject. In addition, the reject level may be varied without materially altering the amplitude of the passed signal or the calibration of the tester.

This is accomplished by providing a tester having reject means wherein a reference or reject level is provided. So long as the signal is below this level the entire signal is blocked and the output is maintained at a fixed level. However, in the event the signal contains a portion in excess of the reference or reject level, that portion is passed and amplified so as to maintain the amplitude of the passed signal substantially the same as the input signal. As a consequence the "noise" is rejected and the output signal has an amplitude corresponding to the amplitude of the input signal rather than just the amount by which the input signal exceeds the reject level. Means are also provided for simultaneously varying the reject level and the gain so that the reject level can be varied by a single adjustment without materially altering the size of the signal or the calibration of the tester.

Figure 2:
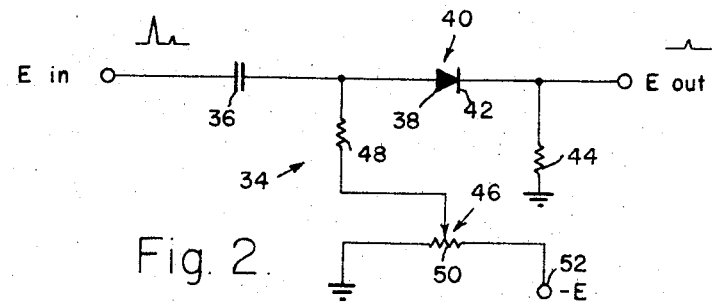
Figure 3:
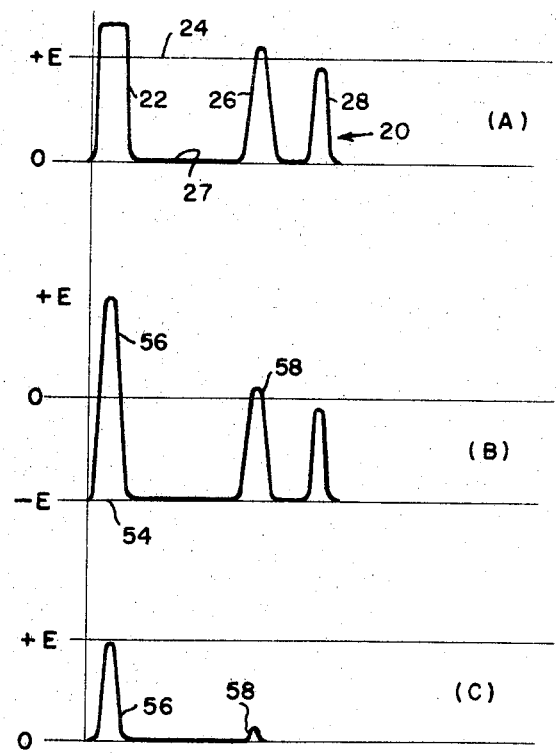
Figure 4:
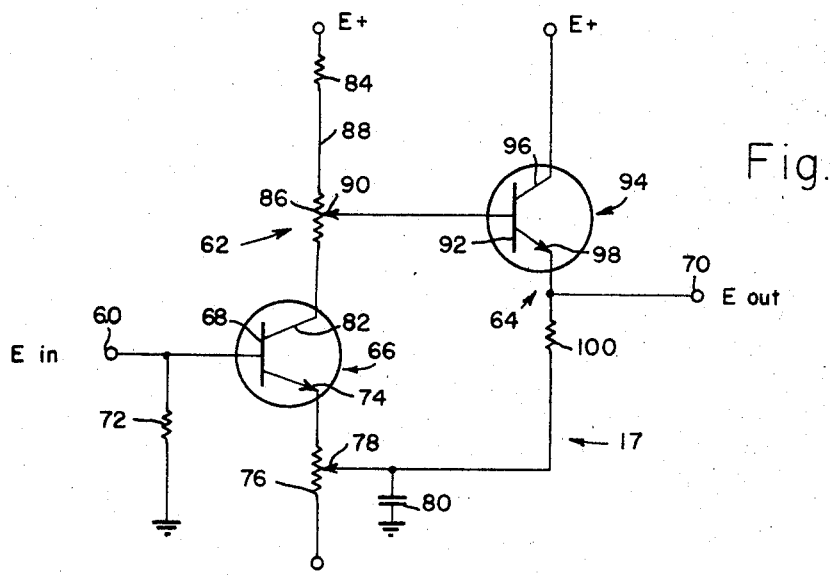
Figure 5:
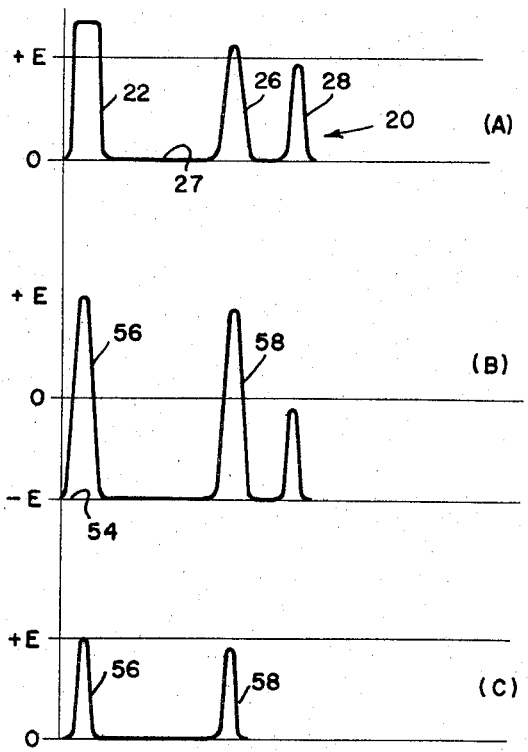

These and other features and advantages of the present invention will be readily apparent from the following detailed description of the present invention. Particularly when taken in connection with the accompanying drawings wherein like reference numerals refer to like parts and wherein;

FIGURE 1 is a block diagram of an ultrasonic tester embodying one form of the present invention, FIGURE 2 is a schematic diagram of a prior art reject circuit, FIGURE 3 is a series of wave forms present in various portions of the prior art reject circuit of FIGURE 2, FIGURE 4 is a schematic diagram of the reject circuit employed in one portion of the ultrasonic tester of FIGURE 1, FIGURE 5 is a series of waveforms present in various portions of the reject circuit of FIGURE 4.

Referring to the drawings in more detail and particularly to FIGURE 1, the present invention is embodied in a nultrasonic nondestructive tester 10. This tester 10 includes a transducer 12 which is adapted to be acoustically coupled to a workpiece 14. A pulser 16 is electrically connected to the transducer 12 and intermittently excites the transducer 12 into transmitting pulses of ultrasonic energy into the workpiece 14. The transducer 12 then receives echoes of these ultrasonic pulses and produces corresponding electrical signals. A receiver 18 is electrically connected to the transducer 12 so as to receive the electrical signals produced by the transducer 12. The receiver 18 includes a reject circuit 17 for rejecting "noise" and an amplifier 19 for amplifying the passed portions of the signal. The output from the receiver 18 is in turn coupled to a suitable indicator such as a cathode ray oscilloscope. The oscilloscope will then produce a visual display of the signals.

The signals from the receiver 18 may be similar to the signal 20 shown in FIGURES 3A and 5A. This signal 20 includes a first large amplitude pulse 22 that is greatly in excess of the "noise" level 24. A pulse of this nature may result from a large amplitude echo such as produced by a large target near the surface of the workpiece 14. Normally pulses of this size are clipped or limited to some maximum amplitude. For example, the limit may be such as to produce full scale deflection on the oscilloscope 19.

The signal 20 also includes a low amplitude pulse 26 that is just in excess of the "noise" level 24. A pulse of this nature may result from a small target and/or a target deep within the workpiece. Identifying such targets is important, and accordingly these pulses 26 are important. In addition, the signal 20 may include "noise" in the form of a pulse 28 that is just below the "noise" level 24. It may be seen that there is very little difference between the amplitudes of the echo pulse 26 and the "noise" pulse 28.

The reject circuits available heretofore have normally been very similar to that shown in FIGURE 2. Such a circuit 34 may include a coupling condenser 36 which blocks the DC portion 27 of the signal 20 but passes AC components such as short pulses 22, 26 and 28 of the type in FIGURE 3A and 5A. The condenser 36 is coupled directly to the plate 38 of a conventional diode 40. The cathode 42 is, in turn, coupled directly to the output. The cathode 42 is also coupled to ground by means of a load resistor 44.

The plate 38 is coupled to a biasing network 46 which includes a fixed resistor 48 and potentiometer 50 extending between a fixed negative voltage 52 and ground.

The center tap of the potentiometer 50 is set at the reject level 54. This level 54 is sufficiently negative to displace the reference portion 27 of the signal 20 below ground level by an amount equal to the "noise" level 24. The resultant signal is shown in FIGURE 3B. This will maintain the diode 40 normally nonconductive. In the event a small amplitude pulse, i.e. the "noise" pulse 28 occurs, even though the plate 38 swings positive it will still remain negative and the diode 40 will remain nonconductive.

However, in the event the echo pluses 22 or 26 occur the plate 38 will swing in a positive direction and actually become positive by an amount equal to the amount by which the pulse 22 or 26 exceeds the "noise" level 24. The diode 40 will become conductive and a pulse will be developed across the load resistor 44. This signal is shown in FIGURE 3C. It is to be noted that only the portions 56 and 58 of the echo pulse 22 and 26 in excess of the reject level 24 are passed. As a consquence when the echo pulse is large, a large pulse 56 is passed and the signal-to-noise ratio is greatly improved.

However, when the echo pulse is small and just barely in excess of the reject level 24, the passed signal 58 will be very small and, in fact, may be in the same region as the "noise" normally present in the circuit. It will thus be seen that a prior art circuit of this nature is not capable of materially improving the signal-to-noise ratio under such borderline circumstances.

Moreover, in the event the potentiometer 50 is adjusted to raise or lower the reject level 54, the amplitude of the passed signals 56 and 58 will also be correspondingly lowered or raised. If the gain of the amplifier 19 is then varied to restore the passed signal to its prior level, the reject level will have to be again adjusted and the tester recalibrated.

The new and improved reject circuit 17 which includes the present invention and is actually used in the tester, is best seen in FIGURE 4. The circuit includes an input 60 which is adapted to be coupled to the transducer either directly or by means of an intervening stage of amplification. The input will thus receive signals similar to that in FIGURE 5A. This signal 20 is substantially identical to that in FIGURE 3A and includes DC or reference portion 27 with the echo pulses 22 and 26 and the undesired "noise" pulses 28 superimposed thereon.

The reject circuit 17 also includes an output 70 that is coupled to the amplifier 19 so as to supply the output signal (FIGURE 5C) thereto. The output signal is similar to the imput signal 20 except that the low amplitude "noise" has been rejected therefrom and the amplitudes of the retained echo pulses have been compensated for the rejected "noise."

The present circuit 17 includes a pair of stages 62 and 64 that are cascaded. The first stage 62 includes a first transistor 66 having the base 68 thereof coupled directly to the input whereby the AC pulses 22 and 26 and the reference or steady state DC level 27 will be present on the base 68. The input 60 and the base 68 are also connected directly to ground by a resistor 72.

The emitter 74 is connected to a negative voltage source by a resistance. If desired, this resistance may be in the form of a potentiometer 76 having its center tap 78 coupled to ground by a bypass condenser 80. Movement of the center tap 78 will not materially effect the DC charcteristics of either stage 62 or 64. However, since the condenser 80 does bypass a portion of the AC signal to ground the center tap 78 is effective to control the AC gain of the first stage 62.

The collector 82 of the transistor 66 is coupled to a positive voltage source by a resistive load. In the present instance this load includes a fixed resistor 84 and a potentiometer 86, which are connected in series with each other. The two resistors may have substantially identical resistances, in which event the AC signals present at the junction 88 therebetween will be equal to approximately half of the signal on the collector 82. Also, the DC bias will vary in a similar manner.

The center tap 90 of the potentiometer 86 is directly coupled to the base 92 of a second transistor 94 forming the second stage 64. The collector 96 of this transisor 94 is connected to a positive source while the emitter 98 is connected to ground by a load resistor 100. The output 70 is connected directly to the emitter 98 so as to be responsive to the signal across the load resistor 100. It will thus be seen that the second transistor 94 will function as an emitter follower. It should also be noted that direct coupling is present throughout the entire reject circuit 17. As a consequence, the various signals, including the DC portions thereof, may be coupled completely through the reject circuit and present across the load resistor 100.

It may be appreciatetd that the base-emitter junction of the second transistor 94 will resemble the diode junction in the prior reject circuits and reject low amplitude "noise." If the various portions of the first stage 62 are adjusted such that the DC operating current in the first transistor 66 produces a slightly positive voltage at the junction 88, then the center tap 90 may be adjusted to maintain the base 92 slightly positive. This will maintain the second transistor 94 conductive. As a consequence the signal coupled through the first stage 62 will appear across the load resistor 100. As a consequence, little or no "noise" will be rejected. However, in the event the first stage 62 is adjusted, and particularly the position of the center tap 90, to provide a reverse bias to the base 92, the transistor 94 will remain non-conductive except when a large positive signal occurs. As a consequence low amplitude "noise" is rejected.

In order to use the present circuit 17 to reject "noise" the center tap 90 may be adjusted away from the junction 88 and towards the collector 82. This will make the base 92 more negative and apply a reverse bias to the transistor 94. This will be effective to maintain the base 92 at a negative level corresponding to the desired reject level. The second transistor 94 will normally be maintained cutoff or non-conductive whereby the output 70 will be clamped to ground. As a consequence the DC or reference level of the output signal will remain at ground potential and free of "noise." In the event a desired echo signal occurs it will exceed the reject level whereby the base 92 will become positive. The transistor 94 will then conduct and a corresponding echo signal will develop across the load resistor 100.

In order to increase the reject level 54 the center tap 90 may be moved towards the collector 82. This increases the negative bias on the base 92 and, therefore, the magnitude of the signal required to cause the transistor 94 to become conductive. Under these conditions higher amplitude "noise" is rejectetd. However, at the same time, the center tap 90 is moved toward the collector 82 and the gain is increased. As a consequence, even though a smaller portion of the echo signal passes through the reject circuit the amount by which it is amplified is increased so as to compensate for the loss of the rejected portion of the signal.

As a consequence the amplitude of the output signal will remain substantially constant even though the reject level is varied. Thus, once the center tap 78 in the AC gain control has been adjusted to produce the desired amount of deflection in the oscilloscope 21 for a given size signal, the reject level 54 may be varied without materially altering the amplitude of the passed portion of the signal.

While only a single embodiment of the present invention has been disclosed herein, it will be readily apparent to persons skilled in the art that numerous changes and modifications may be made thereto without departing from the spirit of the invention. More particularly, the circuitry may be modified to operate without transistors. Also, the means by which the reject level and the gain are compensated may be varied. Accordingly, the foregoing disclosure and description thereof are for illustrative purposes only and do not in any way limit the scope of the present invention which is defined only by the claims which follow.

We claim:

1. An ultrasonic tester including the combination of:
   transducer means for providing a signal having a series of echo pulses therein, said echo pulses having amplitudes that are in excess of a preselected reject level,
   receiver means coupled to the transducer means and responsive to the signal from the transducer means,
   signal reject means and amplifier means in said receiver means responsive to said signal, said reject means being effective to reject the portions of said signal below the preselected reject level and pass the portions of said signal above said level,
   said reject means having control means effective to vary the reject level and the grain simultaneously, whereby the amplitude of the passed portion of the signal remains substantially constant, and
   utilizing means coupled to said receiver means and responsive to the passed portions of the signal.

2. The combination of claim 1 wherein the reject means include:
   a pair of transistors, and
   a coupling between said transistors effective to vary the DC bias on one transistor and the gain of said reject means.

3. The combination of claim 1 wherein the reject means include:
   a first transistor effective to amplify the signal,
   a second transistor effective to reject the portions of said signal below a preselected reject level and to pass the portions of said signal above the reject level, and
   a coupling between said transistors, said coupling including said variable control means simultaneously varying the grain of said first transistor and said reject level.

4. The combination of claim 3 including:
   a second variable control effective to vary the AC gain of said reject means without varying the reject level.

5. A signal rejector including the combination of:
   a first means for receiving a signal, said first means having a gain and being effective to amplify the signal by said gain;
   a second means having a reject level and being effective to reject the portions of said signal below said reject level and to pass the portions of said signal above said reject level;
   coupling means coupling said first and second means to each other for coupling the signals therebetween, said coupling means including a load impedance; and
   means for varying said load impedance for simultaneously determining the gain of the first means and the reject level of the second means;

6. The combination as defined in claim 5 wherein:
   the second means includes a semiconductor device having a cutoff bias that determines the reject level; and
   a resistive load in the first means, coupling said first means to said second means, said load being effective to determine the gain of the first means and the cutoff bias on a semiconductor device.

7. The combination as defined in claim 5 wherein:
   said first means including a first transistor;
   said second means including a second transistor;
   said coupling means including a resistive load for said first transistor, said load being effective to determine the gain of the first means and the bias of the second transistor.

References Cited
UNITED STATES PATENTS

| | | | |
|---|---|---|---|
| 3,056,090 | 9/1962 | Chapmon | 328—115 |
| 3,260,105 | 7/1966 | McNulty | 73—67.9 |

RICHARD C. QUEISSER, Primary Examiner

J. R. FLANAGAN, Assistant Examiner

U.S. Cl. X.R.

307—235